(12) United States Patent
Hung et al.

(10) Patent No.: US 9,500,940 B2
(45) Date of Patent: Nov. 22, 2016

(54) PROJECTOR AND BRIGHTNESS ADJUSTING METHOD THEREOF

(71) Applicant: Coretronic Corporation, Hsin-Chu (TW)

(72) Inventors: Chen-Hsiu Hung, Hsin-Chu (TW); Bai-Nan Ni, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 32 days.

(21) Appl. No.: 14/515,877

(22) Filed: Oct. 16, 2014

(65) Prior Publication Data

US 2015/0241764 A1 Aug. 27, 2015

(30) Foreign Application Priority Data

Feb. 27, 2014 (CN) .......................... 2014 1 0068685

(51) Int. Cl.
*G03B 21/14* (2006.01)
*G03B 21/20* (2006.01)
*G02B 26/00* (2006.01)
*G03B 33/08* (2006.01)

(52) U.S. Cl.
CPC ......... *G03B 21/2053* (2013.01); *G02B 26/008* (2013.01); *G03B 21/204* (2013.01); *G03B 33/08* (2013.01); *G03B 21/2066* (2013.01); *H04N 2209/043* (2013.01)

(58) Field of Classification Search
CPC .............. G02B 26/008; G03B 21/142; G03B 21/2053; G03B 21/2066; H04N 2209/043
See application file for complete search history.

(56) References Cited

U.S. PATENT DOCUMENTS

| 6,419,365 B1 | 7/2002 | Potekev et al. |
| 2006/0002109 A1* | 1/2006 | Imade ................. H04N 9/3114 362/231 |
| 2007/0030684 A1 | 2/2007 | Chan |

FOREIGN PATENT DOCUMENTS

| CN | 1916691 A | 2/2007 |
| CN | 101448166 A | 6/2009 |
| CN | 101620365 A | 1/2010 |
| CN | 101976015 A | 2/2011 |
| CN | 102012614 A | 4/2011 |
| CN | 102450021 A | 5/2012 |
| CN | 102740084 | 10/2012 |
| CN | 103297734 A | 9/2013 |
| CN | 203215380 | 9/2013 |

OTHER PUBLICATIONS

State Intellectual Property Office of the People's Republic of China, "Office Action", issued on Apr. 25, 2016.

* cited by examiner

*Primary Examiner* — Sultan Chowdhury
*Assistant Examiner* — Magda Cruz
(74) *Attorney, Agent, or Firm* — WPAT, PC; Justin King

(57) ABSTRACT

The invention provides a projector and a brightness adjusting method thereof. The projector includes a light source module, a color wheel module, a brightness adjusting device, and a brightness processing module. The light source module is used for emitting a light beam. The color wheel module is used for being excited to generate at least one color light beam by the light beam emitted from the light source module. The brightness adjusting device includes a light sensor and a brightness processing module, wherein the light sensor is disposed on a transmission path of a portion of the color light beam and the brightness processing module is electrically connected to the light sensor for adjusting the brightness value of the color light beam. The brightness adjusting method of projector is also provided.

11 Claims, 5 Drawing Sheets

PROJECTOR AND BRIGHTNESS ADJUSTING METHOD THEREOF

FIELD OF THE INVENTION

The invention relates to a display device, and more particularly to a projector capable of adjusting brightness and a brightness adjusting method thereof.

BACKGROUND OF THE INVENTION

Recently, a conventional projecting image with large size is formed by several images projected by several projectors combined with each other according to an array arrangement. The projectors may project the images to form the projecting image with large size, and the projectors may simultaneously project the same images or different images.

Currently, the technique of combining images projected by several projectors is widely applied to the places needing a large projecting image having a high resolution to show advertisements in the market, in which the places may be indoor/outdoor live houses, commercial exhibitions, entertainment spaces, convention centers, windows of department stores an so on. However, the combining images projected by the projectors may have color or brightness irregularity due to different brightness and color characteristics between each of the projectors. In addition, a light source module of each of the projectors may decay as time goes by so that the color or the brightness of the images may vary with time.

Simultaneously, the combining image projected by the projectors seems to be segmented due to obvious chinks, thus, the integrity of the image is broken and the viewer may feel uncomfortable.

SUMMARY OF THE INVENTION

The invention provides a projector and a brightness adjusting method thereof to be capable of avoiding the foregoing disadvantages.

According to an embodiment of the invention, a projector includes a light source module, a color wheel module, a brightness adjusting device, and a brightness processing module. The light source module is used for emitting a light beam. The color wheel module is used for being excited by the light beam emitted from the light source module to generate at least one color light beam, in which a wavelength of the color light beam is different from a wavelength of the light beam. The brightness adjusting device includes a light sensor and the light sensor is disposed on a transmission path of a portion of the color light beam for sensing a brightness value of the portion of the color light beam. The brightness processing module is electrically connected to the light sensor for adjusting the brightness value of the color light beam.

According to another embodiment of the invention, the brightness processing module includes a threshold setting module electrically connected to the brightness adjusting device for setting at least one default threshold value. The brightness processing module adjusts the brightness value of the color light beam such that the brightness value of the color light beam is equal to the default threshold value when the default threshold value is less than the brightness value of the color light beam and the brightness value of the color light beam remains the same when the default threshold value is larger than or equal to the brightness value of the color light beam.

According to another embodiment in the invention, the projector further includes an image module for receiving the color light beam to transform into an image.

According to another embodiment in the invention, the brightness adjusting device includes a partially reflective mirror disposed on a transmission path of the color light beam for reflecting the color light beam to the image module and the partially reflective mirror is capable of being transmitted by a portion of the color light beam.

According to another embodiment in the invention, the brightness adjusting device includes a light guiding hole, a light-shielding plate, and a shell. The light guiding hole is connected to the shell and the light-shielding plate is disposed on the light guiding hole for adjusting a light quantity of the portion of the color light beam entered into the light sensor.

According to another embodiment in the invention, a brightness adjusting method applied to a projector, the brightness adjusting method includes several steps as follows: emitting a light beam from a light source module, wherein the light beam is transmitted to a color wheel module; rotating the color wheel module such that a color light beam is generated from at least one exciting area of the color wheel module when the light beam is transmitted to the exciting area, wherein a wavelength of the color light beam is different from a wavelength of the light beam; Setting at least one threshold value by a threshold setting module and sensing a brightness value of the color light beam by a brightness adjusting device, wherein the threshold setting module is electrically connected to the brightness adjusting device; adjusting the brightness value of the color light beam to be equal to the default threshold value when the default threshold value is less than the brightness value of the color light beam; and remaining the brightness value of the color light beam the same when the default threshold value is larger than or equal to the brightness value of the color light beam.

According to another embodiment in the invention, the brightness adjusting method further includes several steps as follows: Determining whether the exciting area is located on a transmission path of the light beam; emitting the light beam to the color wheel module when the exciting area is located on a transmission path of the light beam; and measuring the brightness value of the color light beam when the light beam is transmitted to the color wheel module and the color wheel module is completely taking a turn.

According to another embodiment in the invention, the brightness adjusting method further includes: adjusting a current of the light source module such that the brightness value of the color light beam is equal to the default threshold value when the default threshold value is less than the brightness value of the color light beam.

According to another embodiment in the invention, a brightness adjusting method applied to at least two projectors, the brightness adjusting method includes as follows: respectively emitting light beams from at least two light source modules, wherein the light beams are respectively transmitted to the corresponding color wheel modules; rotating the color wheel modules such that each of the color light beams is generated from at least one exciting area of each of the color wheel modules when each of the light beams are transmitted to the corresponding exciting areas, wherein a wavelength of each of the color light beams is different from a wavelength of each of the corresponding light beams; measuring brightness values of the color light beams by each of the brightness adjusting devices of the projectors; and adjusting the brightness values to be an identical brightness value wherein the identical brightness value is the smallest one of the at least two brightness values.

According to another embodiment in the invention, the brightness adjusting method further includes several steps as follows; determining whether each of the exciting areas is located on a transmission path of one of the light beams; emitting each of the light beams to each of the color wheel modules when each of the exciting areas is located on a transmission path of one of the light beams; and calculating each of the brightness values of the corresponding color light beams when each of the light beams is transmitted to each of the corresponding color wheel modules completely taking a turn.

According to another embodiment in the invention, a current of at least one of the light source modules is adjusted such that each of the brightness values of the color light beams is equal to the identical brightness value.

BRIEF DESCRIPTION OF THE DRAWINGS

The above and other objects, features, and advantages of the invention will be more clearly understood from the following detailed description taken in conjunction with the accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
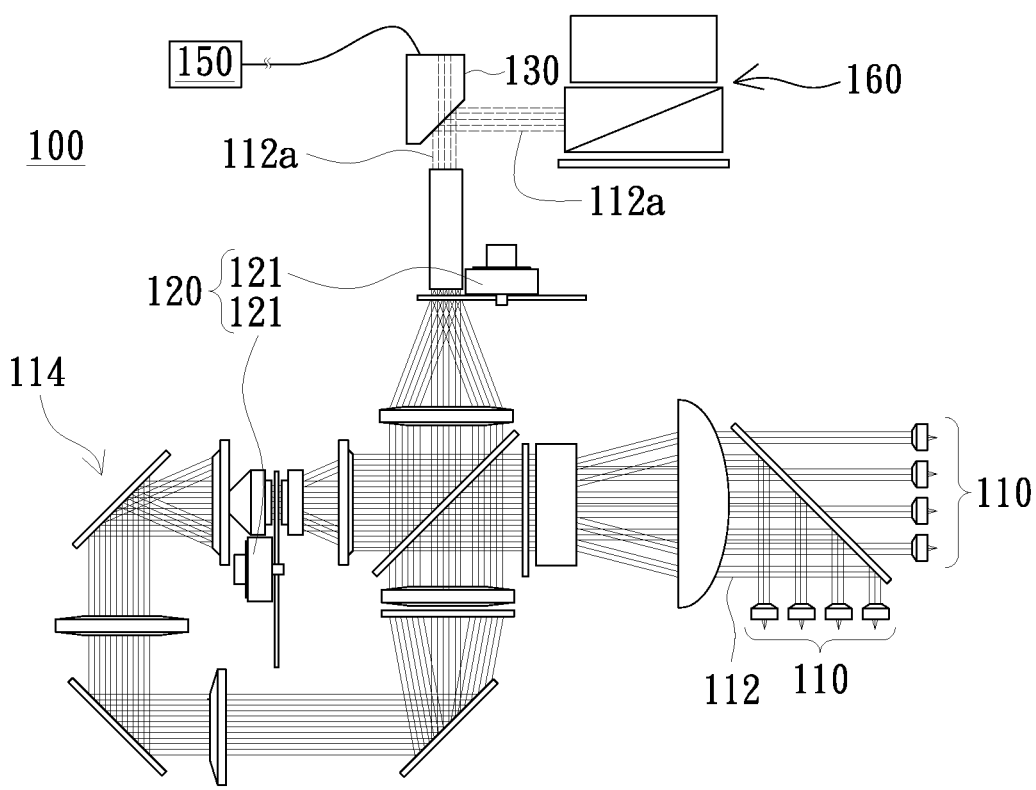
FIG. 1A illustrates a schematic view of a projector according to an embodiment of the invention.

Referring to FIG. 1A, it shows a schematic view of a projector 100 according to an embodiment of the invention. As shown in FIG. 1A, the projector 100 includes a light source module 110, a color wheel module 120, a brightness adjusting device 130, and an image module 160. The brightness adjusting device 130 of the projector 100 may adjust an intensity of electricity applied to the light source module 110 such that the projector 100 projects an image remaining a preferred brightness.

The light source module 110 emits a light beam 112 after the light source module 110 is energized. In this embodiment, the light source module 110 may include a laser, but the invention is not limited thereto. In other embodiments, the light source module 110 may include a light emitting diode or the light source module 110 may include a light emitting diode and a laser simultaneously. In addition, the light source module 110 may emit a blue light, but the invention is not limited thereto. It should be understood that the projector 100 of the embodiment further includes a lenses-reflectors group 114 in order to constructing a light transmitting path for the light beam 112.

The light beam 112 emitted from the light source module 110 is transmitted to the color wheel module 120, in which the color wheel module 120 may include a phosphor wheel 121 and a filter wheel 121', but the invention is not limited thereto. In other embodiments, the color wheel module 120 may includes two phosphor wheels 121. The color wheel module 120 may be excited by the light beam 112 to generate at least one color light beam 112a, in which a wavelength of the color light beam 112a is different from a wavelength of the light beam 112. Moreover, an exciting area 122 (seeing FIG. 4) of the color wheel module 120 may be coated with a wavelength conversion material thereon to be capable of generating the color light beam 112a. The wavelength conversion material may be phosphor or quantum dot phosphor, but the invention is not limited thereto. In another embodiment, the color wheel module 120 may include several exciting areas 122 having different wavelength conversion materials for generating different color light beams 112a. In the present embodiment, the color wheel module 120 includes a phosphor wheel 121 and a filter wheel 121', however, the invention is not limited thereto, number of the color wheel may be one or over three.

Figure 1B:
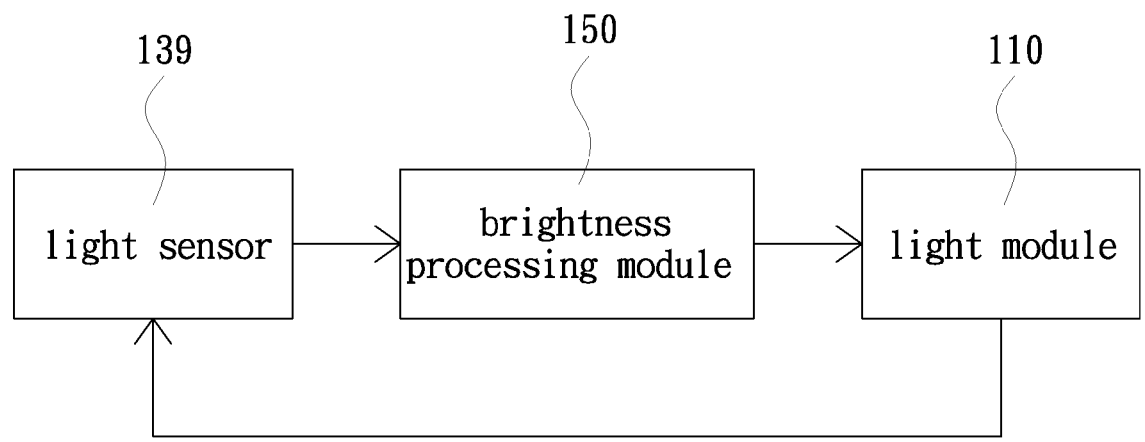
FIG. 1B illustrates a functional block diagram of a signal transmission for brightness adjusting according to another embodiment of the invention.
Figure 2:
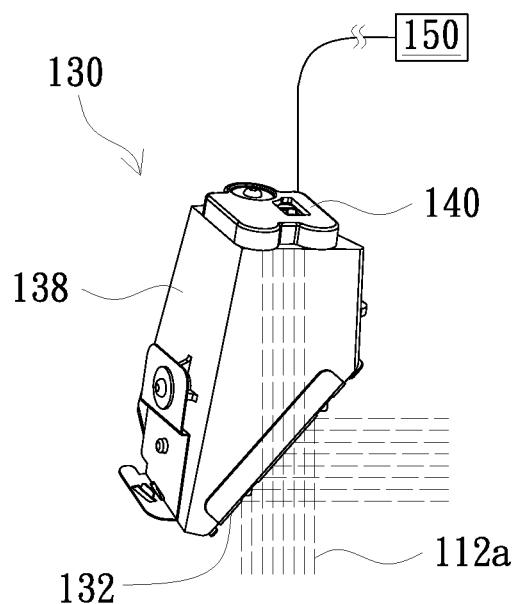
FIG. 2 illustrates a schematic view of a brightness adjusting device according to another embodiment of the invention.
Figure 3:
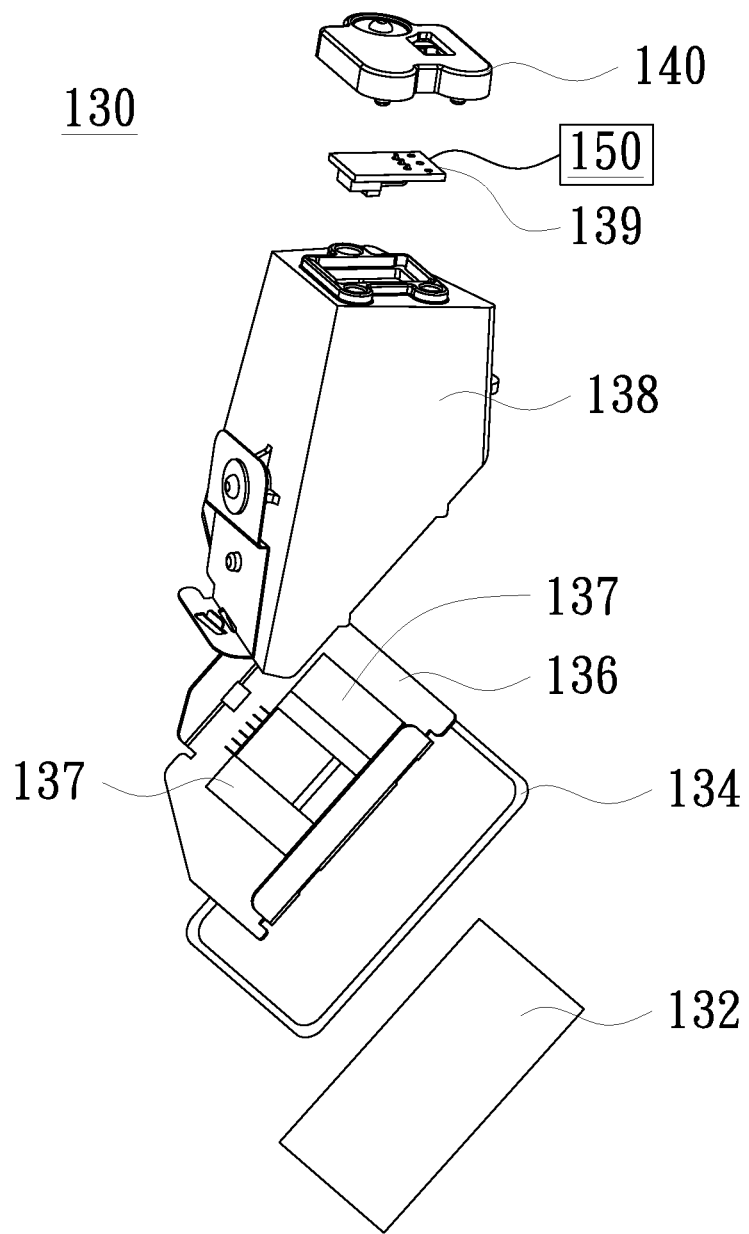
FIG. 3 illustrates an exploded view of a brightness adjusting device according to another embodiment of the invention.

The color light beam 112a generated by the color wheel module 120 may be transmitted to the brightness adjusting device 130. The brightness adjusting device 130 may analyze and adjust the brightness of the color light beam 112a. Please refer to FIG. 1B, FIG. 2, and FIG. 3, FIG. 1B shows a functional block diagram of a signal transmission for brightness adjustment according to another embodiment of the invention, FIG. 2 shows a schematic view of the brightness adjusting device 130 according to another embodiment of the invention, and FIG. 3 shows an exploded view of the brightness adjusting device 130 according to another embodiment of the invention. The brightness adjusting device 130 includes a partially reflective mirror 132, a light guiding hole 136, a shell 138, a light sensor 139, and a cover 140. The light guiding hole 136 is connected to the shell 138, the partially reflective mirror 132 is disposed on a transmission path of the color light beam 112a for reflecting most of the color light beam 112a to the image module 160, and the partially reflective mirror 132 is capable of being transmitted by a portion of the color light beam 112a. In other words, only a portion of the color light beam 112a is transmitted through the partially reflective mirror 132, and then the portion of the color light beam 112a passes through the light guiding hole 136 into the brightness adjusting device 130 such that the brightness adjusting device 130 may analyze the brightness of the portion of the color light beam 112a. In addition, most of the color light beam 112a may be reflected by a reflective surface of the partially reflective mirror 132 to be transmitted into the image module 160. The image module 160 transforms the color light beam 112a received thereby into an image, thus the projector 100 may project the image. Furthermore, the light sensor 139 is disposed on a transmission path of the portion of the color light beam 112a for sensing a brightness value of the portion of the color light beam 112a. The cover 140 is covered with the light sensor 139 for protecting the light sensor 139. Moreover, the brightness processing module 150 is disposed in the projector 100 and electrically connected to the light sensor 129 for controlling intensity of the electricity applied to the light source module 110 to adjust the brightness value of the color light beam 112a. In this embodiment, the light sensor 129 is constructed with a sensor chip (i.e. CMOS or CCD chip) and a circuit board, and the brightness processing module 150 may be a circuit with a central processing unit (CPU), wherein the CPU may be a DDP442X chip combination produced by the Texas Instruments or the CPU may be a chipset manufactured by other companies, the invention is not limited thereto.

In this embodiment, the brightness adjusting device 130 further includes a cushion 134 disposed between the partially reflective mirror 132 and the light guiding hole 136. The cushion 134 can not only avoid collision between the partially reflective mirror 132 and the light guiding hole 136 causing scratch or breakdown but also decrease the stress from the total weight of the brightness adjusting device 130 putting on the partially reflective mirror 132. For example, the cushion 134 may be a spongy cushion. In addition, the portion of the color light beam 112a passes through the shell 138 into the light sensor 139 such that the light sensor 139 can measure the brightness value of the color light beam 112a after the portion of the color light beam 112a enters into the light guiding hole 136 from the partially reflective mirror 132. Furthermore, the brightness adjusting device 130 further includes a light-shielding plate 137 disposed on the light guiding hole 136, wherein the light guiding hole 136 has scale to be capable of adjusting light quantity of parts of the color light beam 112a entered into the light sensor 139 by the light-shielding plate 137. Thus, the sensitivity of the light sensor 139 may not be reduced due to avoid the excessive color light beam 112a entering into the light sensor 139.

In others word, a brightness adjusting method to adjust the brightness of the projector 100 may be used in the projector 100 shown in FIG. 1A such that several projectors 100 may emit lights having identical brightness and colors when several projectors 100 project combining images simultaneously. In addition, when the brightness adjusting method is used in a single projector 100, the lifetime of the projector 100 may be extended.

In another embodiment, a brightness adjusting method is descried as follows. At first, the light beam 112 is emitted from the light source module 110, in which the light beam 112 is transmitted to a color wheel module 120 along a transmission path of the light beam 112. Then, the color wheel module 120 is rotated such that the color light beam 112a is generated from an exciting area 122 of the color wheel module 120 when the light beam 112 is transmitted to the exciting area 122, in which the wavelength of the color light beam 112a is different from the wavelength of the light beam 112.

After the color wheel module 120 is excited by the light beam 112 to generate the color light beam 112a, the color light beam 112a is transmitted to the partially reflective mirror 132 of the brightness adjusting device 130 such that most of the color light beam 112a is reflected by the reflective surface of the partially reflective mirror 132 to be entered into the image module 160. Most of the color light beam 112a received by the image module 160 is transformed into the image then projected by the projector 100. The other portion of the color light beam 112a passes through the light guiding hole 136 into the brightness adjusting device 130 such that the brightness adjusting device 130 may measure the brightness of the color light beam 112a.

In addition, because the light beam 112 is emitted to the exciting area 122 of the color wheel 121 along a regularly transmission path, it can be determined whether the exciting area 122 is located on the transmission path of the light beam 112 or not. Thus, the light processing module 150 may determine how to adjust the current of the light source module 110 to emit the light beam 112. When the exciting area 122 is located on the transmission path of the light beam 223, the light processing module 150 drives the electricity such that the light source module 110 is energized to emit the light beam 112 to the color wheel module 120. Therefore, the light sensor 139 may receive the color light beam 112a and measure the brightness value of the color light beam 112a when the color wheel module 120 is completely taking a turn. In addition, the color wheel module 120 may generate several color light beams 112a with different colors. In other words, the color wheel module 120 may have several exciting areas 122 disposed on the color wheels 121. When the brightness of each of the color beams 112a needs to be analyzed one by one to adjust the whole brightness of the projector 100, the brightness of each of the color beams 112a generated by each of the exciting areas 122 may be analyzed one by one.

Figure 4:
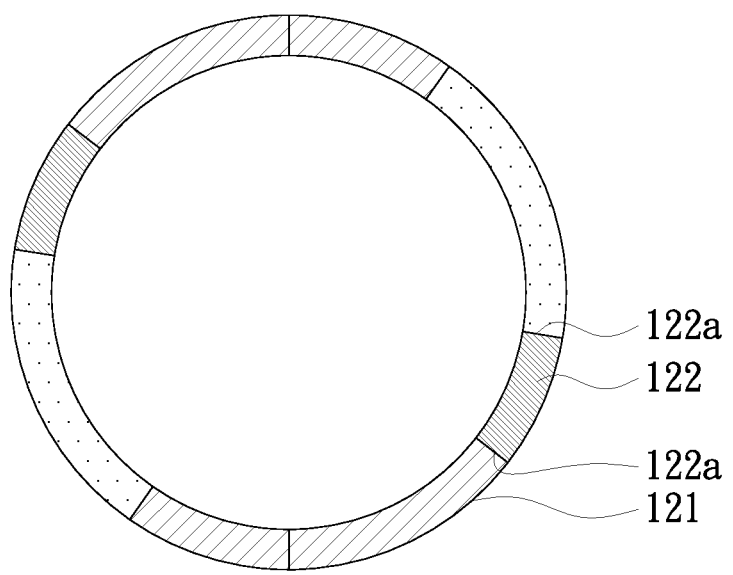
FIG. 4 illustrates a schematic view of one of color wheels of a color wheel module of the projector of FIG. 1A.

For example, FIG. 4 is a schematic view of one of color wheels 121 of a color wheel module 120 of the projector 100 of FIG. 1A. As shown in FIG. 1 and FIG. 4, one of the color wheels 121 has a motor and a black-opaque tape adhered on a lateral side (no shown) of a rotor of the motor, and a light detecting assembly (no shown) is disposed adjacent to a lateral side of the color wheel 121 for detecting a rotational speed of the color wheel 121. When the black-opaque tape adhered on the rotor rotates to contact a detecting spot of the light detecting assembly for measuring the rotational speed of the color wheel 121, the light detecting assembly can not receive a light signal reflected from the color wheel 121. The rotational speed of the color wheel 121 may be measured according to a time difference between the twice times of detecting the black-opaque tape. Then, the time of the color wheels 121 completely taking one turn may be calculated. The rotating angles of the exciting areas 122 may be further process and calculate, thus each timing point of each of the color light beams 112a generated by the color wheel 121 may be obtained. The current applied to the color wheel module 120 is capable of being adjusted according to the each timing point of each of the color light beams 112a generated by the color wheel 121. In other words, the brightness value of each of the color light beams may be calculated by the software of the light processing modules 150 according to the rotating speed of the phosphor wheel or the filter wheel of the color wheel module 120 and the angular changes of each of the exciting areas 122. Thus, the brightness of each of the color light beams 112a may be adjusted according to adjusting the brightness of the light beam 112 based on controlling the current applied to the light source module 110.

Referring to FIG. 2 and FIG. 3, the brightness processing module 150 can further set at least one default threshold value. The brightness value of the color light beam 112a sensed by the light sensor 139 is measured by the brightness processing module 150. In this embodiment, the brightness processing module 150 further includes a threshold setting module (no shown) electrically connected to the brightness adjusting device 130. The threshold setting module may be a user interface capable of inputting user data by a user and the threshold setting module may be used to set at least one default threshold value, in which the default threshold value may be a desired brightness value of the user. The brightness value of the color light beam 112a is adjusted to be equal to the default threshold value by the brightness processing module 150 via adjusting the current applied to the light source module 110 when the default threshold value is less than the brightness value of the color light beam 112a. The brightness value of the color light beam 112a is remained the same when the default threshold value is larger than or equal to the brightness value of the color light beam 112a. For example, when the brightness value of the color light beam 112a is analyzed to 5000 lm and the default threshold value is 4000 lm, the brightness value of the light beam 112 maintains 4000 lm by brightness processing module 150 controlling the current applied to the light source module 110. Therefore, the color and the brightness of the image projected by the projector 100 can be remained the same for long period of time and the decay of the light source module 100 can be retarded.

When the projectors 100 are two or more, it is important to remain the color and the brightness value of a combining image formed by the projectors 100 the same. The light sensor 139 of each of the projectors 100 can measure the brightness value of each of the color light beams 112a, then the brightness processing module 150 of each of the projectors 100 connected to an outer controlling device (not shown) such as a computer may integrate the brightness value of the color light beams 112a to be the same via a cable or a wireless network connected to internet or a cloud computing system, in which the brightness value of each of the color light beams 112a may be the smallest brightness value of the color light beams 112a. In another embodiment, the brightness processing modules 150 can adjust Gamma curve of each of the projectors 100 to be the same.

From the above, the brightness and the color of the image projected by the projector can be adjusted due to controlling the current applied to the light source module such that the lifetime of the light source module of the projector may be extended. Simultaneously, when a combining image is projected by several projectors, the brightness and the color of the combining image can be identically adjusted owing to controlling the current applied to the light source module of each of the projectors, thus, the obvious chinks within the combining image can be avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector comprising:
    a light source module for emitting a light beam;
    a color wheel module for being excited by the light beam emitted by the light source module to generate at least one color light beam wherein a wavelength of the color light beam is different from a wavelength of the light beam;
    a brightness adjusting device comprising a light sensor disposed on a transmission path of parts of the color light beam for sensing a brightness value of parts of the color light beam generated by the color wheel module; and
    a brightness processing module electrically connected to the light sensor and the light source module, wherein the brightness processing module controls the light source module for adjusting the brightness value of the color light beam generated by the color wheel module.

2. The projector according to claim 1, wherein the brightness processing module comprises a threshold value setting module electrically connected to the brightness adjusting device for setting at least one default threshold value, wherein the brightness processing module adjusts the brightness value of the color light beam such that the brightness value of the color light beam is equal to the default threshold value when the default threshold value is less than the brightness value of the color light beam, and the brightness value of the color light beam remains the same when the default threshold value is larger than or equal to the brightness value of the color light beam.

3. The projector according to claim 1, further comprising an image module for receiving the color light beam to transform into an image.

4. The projector according to claim 3, wherein the brightness adjusting device comprises a partially reflective mirror disposed on a transmission path of the color light beam for reflecting the color light beam to the image module and the partially reflective mirror is capable of being transmitted by a portion of the color light beam.

5. The projector according to claim 1, wherein the brightness adjusting device comprises a light guiding hole, a light-shielding plate, and a shell, the light guiding hole is connected to the shell, and the light-shielding plate is disposed on the light guiding hole for adjusting a light quantity of the portion of the color light beam entered into the light sensor.

6. A brightness adjusting method applied to the projector according to claim 1, the brightness adjusting method comprising:
    emitting a light beam from a light source module wherein the light beam is transmitted to a color wheel module;
    rotating the color wheel module such that a color light beam is generated from at least one exciting area of the color wheel module when the light beam is transmitted to the exciting area wherein a wavelength of the color light beam is different from a wavelength of the light beam;
    setting at least one default threshold value by a threshold setting module of a brightness processing module and sensing a brightness value of the color light beam generated by the color wheel module by a brightness adjusting device wherein the threshold setting module is electrically connected to the brightness adjusting device;
    adjusting the brightness value of the color light beam generated by the color wheel module to be equal to the default threshold value through the brightness processing module controlling the light source module when the default threshold value is less than the brightness value of the color light beam; and
    remaining the brightness value of the color light beam generated by the color wheel module through the brightness processing module controlling the light source module when the default threshold value is larger than or equal to the brightness value of the color light beam.

7. The brightness adjusting method according to claim 6, further comprising:
    determining whether the exciting area is located on an transmission path of the light beam;
    emitting the light beam to the color wheel module when the exciting area is located on the transmission path of the light beam; and
    measuring the brightness value of the color light beam when the light beam is transmitted to the color wheel module and the color wheel module is completely taking a turn.

8. The brightness adjusting method according to claim 6, further comprising:
    adjusting a current of the light source module such that the brightness value of the color light beam is equal to the default threshold value when the default threshold value is less than the brightness value of the color light beam.

9. A brightness adjusting method applied to at least two projectors according to claim 1, the brightness adjusting method comprising:
    respectively emitting light beams from light source modules wherein the light beams are respectively transmitted to the corresponding color wheel modules;
    rotating the color wheel modules such that each of a color light beam is generated from at least one exciting area of each of the color wheel modules when the light beams are transmitted to the corresponding exciting areas, wherein a wavelength of each of the color light beams is different from a wavelength of each of the corresponding light beams;
    measuring brightness values of the color light beams generated by the corresponding color wheel module by each of the brightness adjusting devices of the projectors; and
    adjusting the brightness values generated by the corresponding color wheel module to be an identical brightness value through the brightness processing module controlling the light source module wherein the identical brightness value is the smallest of the brightness values.

10. The brightness adjusting method according to claim 9, further comprising:
    determining whether each of the exciting areas is located on a transmission path of each of the corresponding light beams;
    emitting each of the light beams to each of the corresponding color wheel modules when each of the exciting areas is located on a transmission path of each of the corresponding light beams; and
    calculating each of the brightness values of the corresponding color light beams when each of the light beams is transmitted to each of the corresponding color wheel modules completely taking a turn.

11. The brightness adjusting method according to claim 9, wherein a current of at least one of the light source modules is adjusted such that each of the brightness values of the color light beams is equal to the identical brightness value.

* * * * *